J. H. TEUTEBERG & P. E. SCHAFER.
EMERGENCY OPERATING DEVICE FOR AIR BRAKES.
APPLICATION FILED JAN. 6, 1915.
1,159,292. Patented Nov. 2, 1915.
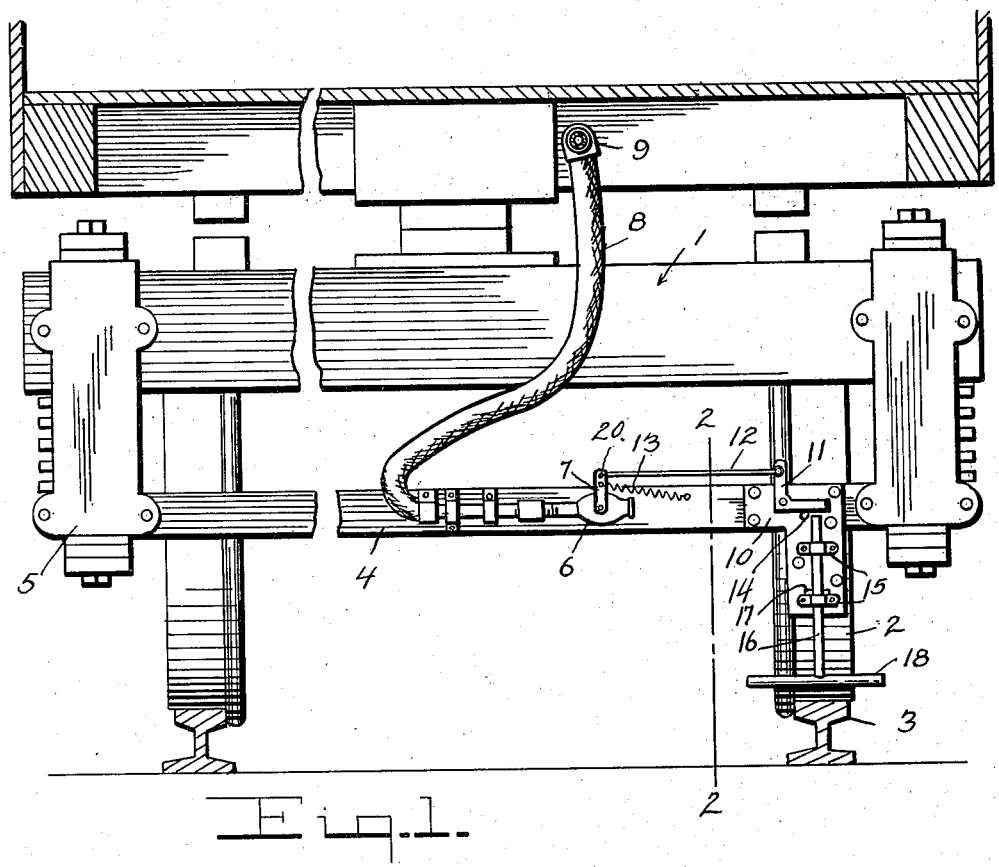
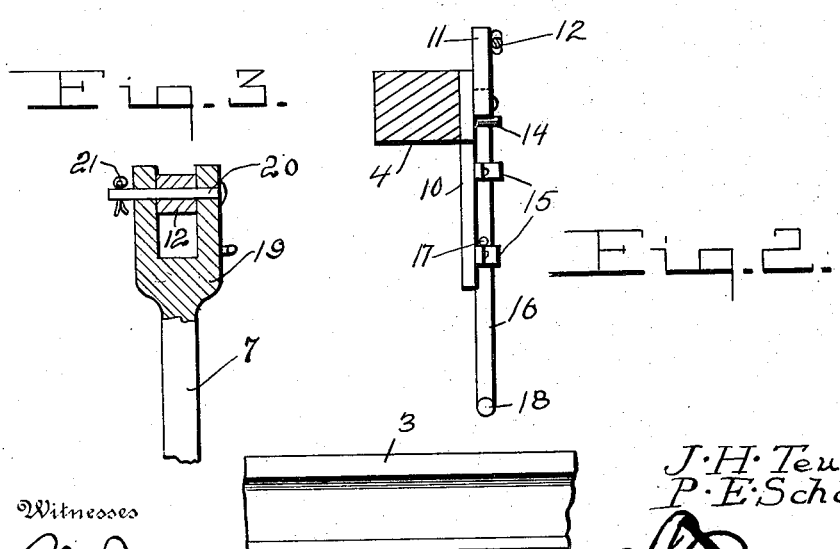
Witnesses
Inventors
J. H. Teuteberg
P. E. Schafer

UNITED STATES PATENT OFFICE.

JEREMIAH H. TEUTEBERG AND PHILIP E. SCHAFER, OF BALTIMORE, MARYLAND.

EMERGENCY OPERATING DEVICE FOR AIR-BRAKES.

1,159,292.        Specification of Letters Patent.        Patented Nov. 2, 1915.

Application filed January 6, 1915. Serial No. 814.

*To all whom it may concern:*

Be it known that we, JEREMIAH H. TEUTEBERG and PHILIP E. SCHAFER, citizens of the United States, residing at Baltimore city, in the State of Maryland, have invented certain new and useful Improvements in Emergency Operating Devices for Air-Brakes; and we do hereby declare the following to be a full, clear, and exact description of the invention, such as will enable others skilled in the art to which it appertains to make and use the same.

Our invention relates to improvements in emergency air brake operating devices of the type which operate automatically to release the air from the train line pipe when a truck or trucks of a car or cars of a train become derailed. Applicants are aware of emergency operating devices in which elements are arranged to open a vent valve connected with the train line when a truck becomes derailed but in most of these devices flexibility of the operating elements is not provided to the extent that operation of the valve at the wrong time is guarded against for example upon vertical movement of the car in jolting or in rounding a curve. It is our intention to obviate the above mentioned difficulties by providing operating elements for the vent valve and a connection for the valve and train pipe that are permitted a great amount of flexibility and are not effected by the vertical or lateral swaying or movement of the car.

Another object is to improve and simplify the construction and operation of emergency operating devices of the character described so as to render them more practical and efficient without materially increasing the cost of manufacture or installation thereof.

The above and additional objects are accomplished by such means as are illustrated in the accompanying drawings, described in the following specification and then more particularly pointed out in the claims.

With reference to the drawings, wherein we have illustrated the preferred embodiment of our invention as it is reduced to practice, and throughout the several views of which similar reference numerals designate corresponding parts, Figure 1 is a cross sectional view of a car showing it equipped with our improved emergency operating device. Fig. 2 is a fragmentary detail vertical sectional view taken on line 2—2 of Fig. 1. Fig. 3 is a detail sectional view of the detachable connection of the operating mechanism with the handle.

Referring to the drawings, 1 designates a truck of a car, 2 the wheels thereof, and 3 the rails upon which the wheels are mounted.

Our improved emergency air brake operating means is mounted upon the trucks of the cars of the train in advance of the wheels of the trucks and comprises a horizontal supporting bar 4 that is secured at its ends to the spring supporting frame 5 of the truck and is thus maintained in horizontal position at all times. Carried upon this bar 4 is a vent valve 6 provided with an operating handle or lever 7. A flexible hose 8 connects the valve 6 with the train line pipe 9, the hose being of such length as to permit the car body to move without communicating a pull to the valve.

Secured to the bar 4 adjacent to one end thereof is an L-shaped plate 10 which has its vertical portion in depending relation to said bar. Pivotally mounted upon the horizontal portion of the plate 10 is a bell crank 11. A connecting rod 12 is pivotally connected at its ends to the valve lever or handle 7 and to the bell crank at the upper end of said bell crank. A retractile spring 13 is secured to the bar 4 and to the valve lever or handle 7 and normally holds the valve in closed position. Carried by the plate 10 is a stop pin 14 which is engaged by the bell crank 11 and limits the downward movement of said bell crank to prevent the spring 13 from pulling the handle or lever 7 to cause the valve to open. Mounted in brackets 15 that are carried upon the depending portion of the plate 10 is a vertically slidable operating rod 16 which carries a collar 17 intermediate its ends. The collar 17 engages the lowermost bracket 15 and holds the bar normally with the upper end in spaced relation to the bell crank but at a point beneath said bell crank as shown clearly in Fig. 1 in the drawings. Carried upon the lower end of this rod 16 is a transversely extending bar 18 which will be hereinafter referred to as the rail engaging shoe. This rail engaging shoe 18 is disposed in juxtaposition to the rail 3 in advance of the adjacent wheel 2 and so as to engage said rail should the wheel leave the rail. It will be seen that in having the upper end of the bar 15 spaced from the bell crank, the car will be permitted vertical movement and will not effect the rocking of the bell crank which is caused to open the valve 6, and an application of the brakes. This arrangement also allows for the relative movement of the car body when the car is rounding a curve.

The valve stem 7 is provided with a forked free end 19 which receives the rod 12. A headed and apertured pin 20 is inserted through the sides of the forked portion 19 and the aperture formed in the adjacent end of the connection rod 12 and a cotter pin 21 is inserted through the apertured end of the pin 20 to hold the pin in position. It will be seen that we have provided a detachable connection between the rod 12 and handle 7. In having this detachable connection, the valve handle 7 may be quickly and easily disconnected from the rod 12 and this is desirous when a truck has become derailed and it becomes necessary to close the valve 6 so as to release the brakes. Were it not for the detachable connection when the device becomes derailed, the valve 6 is held open and the brakes remain set, but with the simple form of connection provided, some member of the train crew may readily remove the cotter pin and disconnect the parts in order that the valve may be closed.

In operation, should the truck become derailed the shoe 18 would immediately engage the rail 3 and the bar 16 will be forced upwardly. Upon the upward movement of the bar 16 the bell crank 11 will be engaged and rocked so as to cause the valve 6 to be opened. Upon the opening of the vent valve the brakes, not shown, on the train will be applied. The spring 13 returns the mechanism to normal position, while the rod 16 and shoe 18 will drop by force of gravity into normal position after the wheels have been replaced upon the rails.

With reference to the foregoing description, it will be observed that we have provided emergency operating means for air brakes that is entirely automatic and will operate only when the wheels of the train are derailed. The flexibility of the various elements comprising our device we consider one of the most essential points of our invention.

In practice, we have found that the form of our invention, illustrated in the drawings and referred to in the above description, as the preferred embodiment, is the most efficient and practical; yet realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as claimed.

What is claimed is:—

1. The combination with a car truck, and an air pipe line, of a vent valve having an operating lever and carried by the said truck, a flexible element connecting said valve with the air line pipe, a lever connected with the operating lever of the valve and arranged to swing transversely of the car truck, a vertically movable shoe having a rod normally spaced from the last mentioned lever and arranged to actuate the same to open the valve, said shoe and rod being free to drop by gravity to its normal position and means for automatically returning the valve to its closed position whereby the device will automatically reset itself when a car is replaced.

2. The combination with a car truck, and an air pipe line, of a vent valve including an operating lever, a bell crank lever carried by and arranged to swing transversely of the truck and located above one of the rails and having one arm connected with the operating lever of the valve, a shoe provided with a rod arranged to engage the other arm of the bell crank lever to open the valve, said shoe being adapted to drop by gravity out of engagement with the bell crank lever, when a car is replaced, a stop for limiting the movement of the bell crank lever in one direction and a spring for returning the valve to its closed position whereby the device will automatically reset itself.

In testimony whereof we affix our signatures in presence of two witnesses.

JERRY H. TEUTEBERG.
PHILIP E. SCHAFER.

Witnesses:
JOSEPH L. McALLISTER,
MARY E. McALLISTER.

Copies of this patent may be obtained for five cents each, by addressing the "Commissioner of Patents, Washington, D. C."